United States Patent Office 3,153,651
Patented Oct. 20, 1964

3,153,651
1-OXO-2-(3-GLUTARIMIDYL) ETHANE DERIVATIVES AND PREPARATION THEREOF
Francis Johnson, Newton Lower Falls, Mass., assignor to The Dow Chemical Company, Midland, Mich., a corporation of Delaware
No Drawing. Filed Nov. 1, 1961, Ser. No. 149,162
17 Claims. (Cl. 260—281)

The present invention is directed to a process for preparing novel glutarimide derivatives.

It is an object of this invention to provide ester derivatives of glutarimide. This invention also provides processes for preparing the aforementioned compounds.

I discovered that novel unsaturated ester derivatives of 1-oxo-2-(3-glutarimidyl) ethane can be prepared from acylated enamines, by treating the enamine with an acylating agent and then hydrolyzing in an acid aqueous solution. The reaction is illustrated in the following equation:

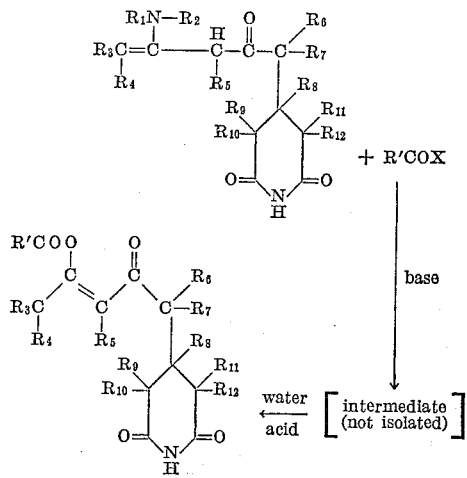

$R_3$–$R_{12}$ may be hydrogen or any substituting group or radical, such as lower alkyl, aryl, alkoxyl, aryloxyl, dialkylamino, halogen, etc. These are exemplified by methyl, butyl, benzyl, octyl, phenyl, diethylamino, phenoxyl, methoxyl, etc. $R_6$–$R_{12}$ are preferably hydrogen or lower alkyl. It is also preferred that not more than one hydrogen should be substituted for on a ring carbon.

The $R_4$–$R_5$ groups may be cyclized or fused to form cyclic moieties. These moieties may, and usually do, contain substituting groups on the ring carbons. The preferred $R_4$–$R_5$ containing moieties have the formula

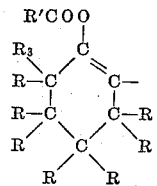

The preferred $R_3$ and R groups are hydrogen, lower alkyl and halogen. It is also preferred that at least one R on each ring carbon atom should be hydrogen. The useful substituting groups are those that do not react with any of the components in the reaction mixture. The $R_1$ and $R_2$ groups may be lower alkyl; preferably, together with the nitrogen atom, they constitute amines such as morpholine, piperidine, pyrolidine, etc. The acylated enamines used as the reactant in the preparation of the desired ester is prepared by treating the glutarimide β-acetyl chloride with an enamine of a cyclic ketone or of a secondary amine in a solvent containing a tertiary ammonium base. The process for preparing the adduct is described in applicant's copending application filed of even date herewith entitled "Cyclic Compounds," Serial No. 149,230. The disclosure of said application is by this reference incorporated herein.

Any conventional acylating agent, R'COX, may be used in the first stage of the reaction. They include the acid halides and equivalent acid anhydrides. Good results have been obtained with acetyl chloride as well as with glutarimide β-acetyl chloride. The acylhalides in which R' is a phenyl or lower alkyl are preferred. The acylation is carried out in the presence of a base. The reaction mixture used to prepare the acylated enamine is useful. Such bases as triethyl amine, diethyl(phenyl) amine and pyridine are illustrative of those that are useful.

After the acylation is completed, the reaction mixture is poured into a silghtly acid aqueous solution. Buffered solutions having a pH between 3 and 7 are preferred.

The unsaturated ester derivatives of 1-oxo-2-(3-glutarimidyl) ethane are hydrogenated to the corresponding saturated compounds. These compounds are hydrogenated using a catalyst specific to the reduction of the double bond, such as palladium, platinum, rhodium, Raney nickel, etc. Room temperature and normal pressure, with a noninterfering solvent, such as ethyl acetate, dioxane, acetone, chloroform, dimethylformamide, etc., are used. The structure of the hydrogenated glutarimide derivavtive follows:

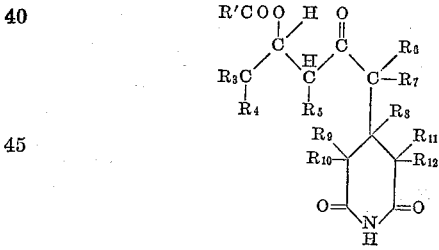

For purposes of further explaining the invention to those skilled in the art, the following illustrative examples are given. In each of the examples the preparation of the glutarimide β-acetyl chloride adduct with the enamine of the ketone used as the starting material is also described.

*Example 1*

3-carboxymethylglutarimide (5.16 g.) was converted into the acid chloride in the usual way. This material without further purification was suspended in dry chloroform (75 ml.) and treated with a solution of triethylamine (6.07 g.) in chloroform (25 ml.) over a period of 20 minutes with stirring at ice bath temperatures. After stirring for a further 10 minutes the morpholine enamine of cyclohexanone (10.03 g.) was added dropwise during 20 minutes. Stirring was continued for 5 hrs. at room temperature and at this point the mixture was homogeneous but brown in color. A solution of acetyl chloride (7.25 g.) in chloroform (10 ml.) was then added dropwise over 40 minutes at ice bath temperatures. Subsequently, stirring was continued for 16 hrs. The total reaction mixture was poured into a solution of sodium acetate (25 g.) in acetic acid (20 ml.) and water (100 ml.). The biphasic liquid which resulted was stirred vigorously for 5 hrs. and the chloroform layer then separated. The aqueous phase was extracted with methylene chloride (50 ml.) and both organic extracts were combined, washed with hydrochloric acid (100 ml.; 1 N) followed by sodium hydrogen carbonate solution (100 ml.; 5%). The organic phase was then dried over magnesium sulfate and after filtration the volatile solvents were removed by distillation on the steam bath using a water pump vacuum. The crude brown viscous product (12.5 g.) was dissolved in a mixture of methylene chloride and light petroleum (150 ml.; 1:1) and chromatographed over silica gel (300 g.), column size 30 x 4.5 cm. The column was then eluted with methylene chloride containing increasing quantities of ethyl acetate. The desired product was obtained elution of the column with methylene chloride containing 20% of ethyl acetate. The yield of total crude product was 5 grams and this on recrystallization from methylene chloride and light petroleum (B.P. 60–75°) gave pure 1-oxo-1[(2-acetoxycyclohexenyl)-2-(3-glutarimidyl)]ethane (4.4 g.), M.P. 114—115°. A sample of this material recrystallized twice from the same solvents still had M.P. 114–115°.

0.5 g. of this product was added together with rhodium on alumina catalyst (100 mg.; 5% rhodium) to ethyl acetate (40 ml.). The mixture was warmed gently to effect solution of the organic component, then cooled and stirred with hydrogen for 45 min. During this period hydrogen absorption occurred (0.95 equiv.) and terminated, the reduction being carried out at room temperature and pressure. After removal of the catalyst by filtration the water-white filtrate was evaporated under reduced pressure to give a highly crystalline white solid, M.P. 120–145° (softening at 110°). One recrystallization of this solid from a mixture of ethyl acetate and light petroleum (B.P. 65–75°) gave the almost pure substance (0.4 g.), M.P. 145–147°. Two further recrystallizations from the same solvents gave pure 3-[2-oxo-2-(2-acetoxycyclohexyl)ethyl]glutarimide, M.P. 150–151°.

Example 2

3-carboxymethylglutarimide (1.7 g.) was converted into the acid chloride using a known procedure. The resulting crude material was suspended in dry chloroform (50 ml.) and treated with a solution of triethylamine (2.0 g.) in dry chloroform (25 ml.) over a period of 20 minutes while stirring at ice bath temperatures. The morpholine enamine of 2,4-dimethylcyclohexanone (3.5 g.) was then added during half an hour while stirring at room temperature. Stirring was continued overnight during which time the mixture became brown in color and almost homogeneous, only a very small amount of solid remaining in suspension. At this point a solution of acetyl chloride (2.5 g.) in chloroform (10 ml.) was added under nitrogen at ice bath temperatures. The liquid was stirred for 3 hrs. and then filtered to remove a trace of insoluble material. The filtrate was poured into a solution of sodium acetate (25 g.) in acetic acid (20 ml.) and water (100 ml.). The biphasic system was stirred for 2½ hours and the chloroform layer separated. The aqueous phase was extracted with methylene chloride (50 ml.) and the combined organic extracts washed with hydrochloric acid (100 ml.; 1 N) followed by sodium hydrogen carbonate solution (100 ml.; 5%). After drying over anhydrous magnesium sulfate the volatile solvents were removed by evaporation under reduced pressure. The pale-brown viscous residue (4.4 g.) was then chromatographed on silica gel (90 g.). The column was eluted with methylene chloride containing increasing amounts of ethyl acetate, the desired product being eluted by methylene chloride containing 20% of ethyl acetate. The crude yellow oil obtained from this solvent mixture (750 ml.) was crystallized from a mixture of light petroleum (B.P. 30–60°) and ether, to give a good crystalline solid (1.25 g.), M.P. 112–115°. A second crop (0.075 g.) had a melting point of 109–112°. These crops were combined and crystallized to give pure 1-oxo-1 - [(2-acetoxy-3,5-dimethylcyclohexenyl)-2-(3-glutarimidyl)]ethane (1.075 g.), M.P. 115–116°. Further crystallization of the material did not improve the melting point.

0.3 g. of this product was dissolved in ethyl acetate (20 ml.). Rhodium on alumina catalyst (0.12 g.; 5% rhodium) was added and the mixture stirred at room temperature and pressure with hydrogen for 45 min. During this period hydrogen absorption (1.13 equiv.) occurred and ceased. The catalyst was removed by filtration and the solvent by distillation under reduced pressure. The glassy residue solidified on trituration with ether. Because crystallization did not easily give the pure reduction product, the total material (0.296 g.) was chromatographed on silica gel. The column was then eluted with methylene chloride containing increasing amounts of ether. The required material (0.25 g.) was eluted with methylene chloride containing 5% ether. Several recrystallizations of this substance from ether and light petroleum or from ethanol and light petroleum gave pure 3-[2 - oxo-2-(2-acetoxy-3,5-dimethylcyclohexyl)ethyl] glutarimide, M.P. 140–141°.

Example 3

Following the procedure of Example 2, the morpholine enamine of 2-methylcyclohexanone is used in place of the enamine of 2,4-dimethylcyclohexanone, to yield 1-oxo-1 - [(2-acetoxy-3-methylcyclohexenyl) - 2 - (3-glutarimidyl)]ethane; which is hydrogenated to 3-[2-oxo-2-(2-acetoxy-3-methylcyclohexyl) ethyl] glutarimide.

Example 4

Following the procedure of Example 3, benzoylchloride is used in place of acetyl chloride and the morpholine enamine of 3,4-diethylcyclohexanone is used in place of the enamine of 2,4-dimethylcyclohexanone, to 1-oxo-1-(2 - benzoyloxy-4,5-diethylcyclohexenyl)-2,(3-glutarimidyl)]ethane which is hydrogenated to yield 3-[2-oxo-2-(2-benzoyloxy-4,5-diethylcyclohexyl)ethyl] glutarimide.

Example 5

Following the procedure of Example 2, the morpholine enamine of 4-ethoxycyclohexane is used in place of the enamine of 2,4-dimethylcyclohexanone to yield 1-oxo-1 - [(2 - acetoxy - 5 - ethoxycyclohexenyl) - 2 - (3-glutarimidyl)]ethane; which is hydrogenated to 3-[2-oxo-2-(2-acetoxy-5-ethoxycyclohexyl)ethyl]glutarimide.

Example 6

Following the procedure of Example 2, the butyryl chloride is used in place of acetyl chloride and the morpholine enamine of 2,4-dibutylcyclohexanone is used in place of the enamine of 2,4-dimethylcyclohexanone to yield 1-oxo-1-[(2-butoxy-3,5-dibutylcyclohexenyl)-2-(3-glutarimidyl)]ethane; which is hydrogenated to 3-[2-oxo-2-(2-butoxy-3,5-dibutylcyclohexyl)ethyl]glutarimide.

The saturated and the unsaturated ester derivatives of glutarimide described herein are active biological materials. These materials have fungicidal activity. They are also rodent repellents.

Although my invention has been illustrated by specific examples, it is to be understood that it includes all modifications and variations that come within the scope of the appended claims.

What is claimed is:
1. A compound of the formula wherein the R groups are selected from the class consisting of hydrogen, lower alkyl, and lower alkoxy and R' is selected from the group consisting of phenyl and lower alkyl.

2. A compound of the formula wherein the R groups are selected from the class consisting of hydrogen, lower alkyl, and lower alkoxy, and R' is selected from the group consisting of phenyl and lower alkyl.

3. A compound of the formula wherein the $R_1$–$R_{12}$ groups are selected from the group consisting of hydrogen, lower alkyl and lower alkoxy, and R' is selected from the group consisting of phenyl and lower alkyl.

4. 1 - oxo - 1 - [(2 - acetoxycyclohexenyl) - 2 - (3-glutarimidyl)]ethane.

5. 1 - oxo 1 - [(2 - acetoxy - 3,5 - dimethylcyclohexenyl)-2-(3-glutarimidyl)]ethane.

6. 1 - oxo - 1 - [(2 - acetoxy - 3 - methylcyclohexenyl)-2-(3-glutarimidyl)]ethane.

7. 1 - oxo - 1 - [(2 - benzoyloxy - 4,5 - diethylcyclohexenyl)-2-(3-glutarimidyl)]ethane.

8. 3 - [2 - oxo - 2 - (2 - benzoyloxy - 4,5 - diethylcyclohexyl)ethyl]glutarimide.

9. 1 - oxo - 1 - [(2 - acetoxy - 5 - ethoxycyclohexenyl)-2-(3-glutarimidyl)]ethane.

10. 3 - [2 - oxo - 2 - (2 - acetoxy - 5 - ethoxycyclohexyl)ethyl]glutarimide.

11. 1 - oxo - 1 - [(2 - butyroxy - 3,5 - dibutylcyclohexenyl)-2-(3-glutarimidyl)]ethane.

12. The process comprising reacting, in a non-protonic solvent containing an amine base, a glutarimide compound having the formula with a cyclic enamine having the formula wherein the R groups are selected from the group consisting of hydrogen and lower alkyl, X is selected from the group consisting of oxygen and methylene, and $n$ is a digit from 1 to 2; adding an acylating agent selected from the group consisting of acid halides having the formula R'COX' wherein R' is selected from the group consisting of lower alkyl and phenyl, and X' is a halide, and equivalent acid anhydrides; and then mixing with a slightly acid aqueous solution to form the unsaturated ester derivative of 1-oxo-2-(3-glutarimidyl) ethane.

13. The process of claim 12 wherein the ethane product is hydrogenated by contacting with hydrogen in the presence of a rhodium on alumina catalyst.

14. The process of claim 13, wherein the reaction of the glutarimide compound and the cyclic enamine is carried out between 0° C. and 40° C. in a solvent containing a tertiary amine base.

15. The process of claim 14 wherein said acid aqueous solution is buffered and has a pH between 3 and 7.

16. The process of claim 15 wherein the glutarimide compound is glutarimide β-acetyl chloride; the cyclic enamine is the morpholine enamine of cyclohexanone; and the acylating agent is acetyl chloride.

17. The process of claim 15 wherein the glutarimide compound is glutarimide β-acetyl chloride; the cyclic enamine is the morpholine enamine of 2,4-dimethylcyclohexanone; and the acylating agent is acetyl chloride.

References Cited in the file of this patent

Karrer: Organic Chemistry, 2nd Ed., pp. 92–102 (1946), QD 251 K32.

Suzuki: Chem. and Pharm. Bull. (Tokyo), vol. 8, No. 9, pages 778–87 (1960), RS I C 4.

Noller: Chemistry of Organic Compounds, 2nd Edition, pages 161–2, and 475, (1957), QD 253 N 65.

Frohardt et al.: Jour. Amer. Chem. Soc., vol. 81, pp. 5500–6 (1952).

Rao: Jour. Org. Chem., vol. 25, pp. 661–2 (1960).

UNITED STATES PATENT OFFICE
CERTIFICATE OF CORRECTION

Patent No. 3,153,651                            October 20, 1964

Francis Johnson

It is hereby certified that error appears in the above numbered patent requiring correction and that the said Letters Patent should read as corrected below.

Column 5, lines 17 to 25, the formula should appear as shown below instead of as in the patent:

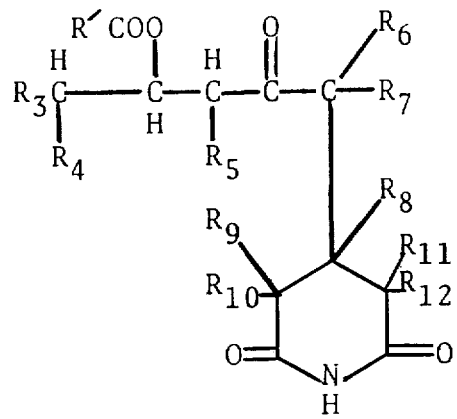

Signed and sealed this 11th day of May 1965.

(SEAL)
Attest:

ERNEST W. SWIDER                       EDWARD J. BRENNER
Attesting Officer                       Commissioner of Patents